(12) United States Patent
Zeng et al.

(10) Patent No.: US 12,202,073 B2
(45) Date of Patent: Jan. 21, 2025

(54) METHOD FOR MANUFACTURING LARGE-AREA VOLUME GRATING VIA PLASMA GRATING DIRECT WRITING

(71) Applicants: Chongqing Institute of East China Normal University, Chongqing (CN); ROI Optoelectronics Technology CO, LTD., Shanghai (CN); East China Normal University, Shanghai (CN)

(72) Inventors: Heping Zeng, Chongqing (CN); Junyi Nan, Chongqing (CN); Mengyun Hu, Chongqing (CN)

(73) Assignees: CHONGQING INSTITUTE OF EAST CHINA NORMAL UNIVERSITY, Chongqing (CN); ROI OPTOELECTRONICS TECHNOLOGY CO, LTD., Shanghai (CN); EAST CHINA NORMAL UNIVERSITY, Shanghai (CN)

( * ) Notice: Subject to any disclaimer, the term of this patent is extended or adjusted under 35 U.S.C. 154(b) by 589 days.

(21) Appl. No.: 17/528,468

(22) Filed: Nov. 17, 2021

(65) Prior Publication Data
US 2022/0152740 A1   May 19, 2022

(30) Foreign Application Priority Data
Nov. 17, 2020   (CN) .......................... 202011283167.5

(51) Int. Cl.
C03C 23/00      (2006.01)
B23K 26/06      (2014.01)
(Continued)

(52) U.S. Cl.
CPC ........ *B23K 26/362* (2013.01); *B23K 26/0608* (2013.01); *B23K 26/0624* (2015.10);
(Continued)

(58) Field of Classification Search
CPC .................................................. C03C 23/0005
See application file for complete search history.

(56) References Cited

U.S. PATENT DOCUMENTS

2021/0323814 A1* 10/2021 Zeng ................... B81C 1/00531
2021/0325581 A1* 10/2021 Zeng ..................... G03F 7/2053

FOREIGN PATENT DOCUMENTS

| CN | 109865939 A | 6/2019 |
| CN | 111408856 A | 7/2020 |
| CN | 111458776 A | 7/2020 |

OTHER PUBLICATIONS

CNIPA, First Office Action for CN Application No. 202011283167. 5, May 20, 2022.

* cited by examiner

*Primary Examiner* — Cynthia Szewczyk
(74) *Attorney, Agent, or Firm* — Hodgson Russ LLP

(57) ABSTRACT

A method for manufacturing a large-area volume grating includes: (1) splitting a laser beam into two or more laser beams, converging the two or more laser beams into a sample at an angle less than 60° to form a first plasma grating; (2) moving the sample in a longitudinal direction of a plane vertical to the first plasma grating to etch out a first prefabricated volume grating; (3) moving the sample laterally to form a second plasma grating, an effective cross section of the first prefabricated volume grating partially overlapping with that of the second plasma grating, then moving the sample in a longitudinal direction of a plane vertical to the second plasma grating to etch out a second prefabricated volume; and (4) repeating steps (2) and (3) n times to obtain a volume grating in any size.

20 Claims, 2 Drawing Sheets

(51) Int. Cl.
*B23K 26/0622* (2014.01)
*B23K 26/067* (2006.01)
*B23K 26/08* (2014.01)
*B23K 26/14* (2014.01)
*B23K 26/362* (2014.01)
*G02B 5/18* (2006.01)
*B23K 103/00* (2006.01)

(52) U.S. Cl.
CPC ...... *B23K 26/0643* (2013.01); *B23K 26/0648* (2013.01); *B23K 26/0673* (2013.01); *B23K 26/0861* (2013.01); *B23K 26/14* (2013.01); *G02B 5/1857* (2013.01); *B23K 2103/54* (2018.08)

METHOD FOR MANUFACTURING LARGE-AREA VOLUME GRATING VIA PLASMA GRATING DIRECT WRITING

CROSS-REFERENCE TO RELATED APPLICATION

This application claims a priority to, and the benefits of, Chinese Patent Application No. 202011283167.5, filed on Nov. 17, 2020, the entire content of which is incorporated herein by reference.

FIELD

The present disclosure relates to the manufacture of diffractive optical elements, and more particularly to a method for manufacturing a large-area volume grating via plasma grating direct writing.

BACKGROUND

Grating devices are widely used in spectrometers, optical communications, laser amplification systems and other fields. Among others, large-area gratings are one of the important optical devices in advancing fields such as astronomical spectrum analysis and laser inertial confinement nuclear fusion. However, the manufacture of the large-area gratings is very difficult, and the technical requirements are much higher than that of small-aperture gratings. At present, there are two ways to manufacture large-aperture gratings: one is to splice multiple small-aperture gratings; the other is to directly manufacture a single grating with a larger size. For the first method, many factors need to be considered and controlled so as to reduce the error in the grating splicing process, and the optimization of the algorithm is still in the experimental verification stage. For the second method, the large-area grating may be directly manufactured by single holographic exposure or by mechanical ruling with an echelle grating-ruling engine. However, this method requires high accuracy, and it is difficult to manufacture gratings in meter scale. Moreover, the cost of the grating-ruling engine is very high.

Therefore, there still needs an improved method for manufacturing a large-area volume grating.

SUMMARY

Embodiments of the present disclosure seek to solve at least one of the problems existing in the related art to at least some extent.

According to a first aspect of the present disclosure, a method for manufacturing a large-area volume grating via plasma grating direct writing is provided. The method includes:

(1) splitting a laser beam output by an ultrafast pulse laser into two or more laser beams with equal power proportion via a splitting module, converging the two or more laser beams into a sample at an included angle θ less than 60° via a spatio-temporal synchronization module and a converging module, such that a first plasma grating is formed in the sample by interference of the two or more laser beams, the sample being fixed on an electronically controlled three-dimensional mobile platform;

(2) moving the sample in a longitudinal direction of a plane vertical to the first plasma grating to etch out a first prefabricated volume grating with an equivalent cross section to that of the first plasma grating;

(3) moving the sample laterally and keeping a distance from a focal point of the two or more laser beams to a front surface of the sample unchanged to form a second plasma grating at another position of the sample, an effective cross section of the first prefabricated volume grating partially overlapping with a cross section of the second plasma grating, then moving the sample in a longitudinal direction of a plane vertical to the second plasma grating to etch out a second prefabricated volume grating with an equivalent cross section to that of the second plasma grating;

(4) repeating steps (2) and (3) n times to obtain a volume grating having a width W=n·w0, a length equal to a length L etched by each plasma grating in a cross section of the sample perpendicular to a propagation direction of the laser, and a depth equal to a length D of optical filaments of each plasma grating formed in the sample, wherein n represents a positive integer greater than 0, w0 represents an effective width of each plasma grating.

According to a second aspect of the present disclosure, a device for manufacturing a large-area volume grating via plasma grating direct writing is provided. The device includes:

an ultrafast pulse laser, configured to emit an ultrafast laser beam;

a splitting module, configured to split the ultrafast laser beam into two or more laser beams;

a spatio-temporal synchronization module, configured to adjust spatio-temporal interval of the two or more laser beams;

a converging module, configured to converge the two or more laser beams into a sample at an included angle θ less than 60°, such that a first plasma grating is formed in the sample by interference of the two or more laser beams; and a three-dimensional mobile platform, configured to:

(1) move the sample in a longitudinal direction of a plane vertical to the first plasma grating to etch out a first prefabricated volume grating with an equivalent cross section to that of the first plasma grating;

(2) move the sample laterally and keep a distance from a focal point of the two or more laser beams to a front surface of the sample unchanged to form a second plasma grating at another position of the sample, an effective cross section of the first prefabricated volume grating partially overlapping with a cross section of the second plasma grating;

(3) move the sample in a longitudinal direction of a plane vertical to the second plasma grating to etch out a second prefabricated volume grating with an equivalent cross section to that of the second plasma grating, such that the sample is moved periodically to periodically manufacture prefabricated volumes to finally obtain a volume grating having a width W=n·w0, a length equal to a length L etched by each plasma grating in a cross section of the sample perpendicular to a propagation direction, and a depth equal to a length D of optical filaments of each plasma grating formed in the sample, wherein n represents a positive integer greater than 0, w0 represents a width of each plasma grating.

According to a third aspect of the present disclosure, a non-transitory computer-readable storage medium is provided. The non-transitory computer-readable storage medium has stored therein instructions that, when executed by a processor of a mobile terminal, causes the method as described above to be performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
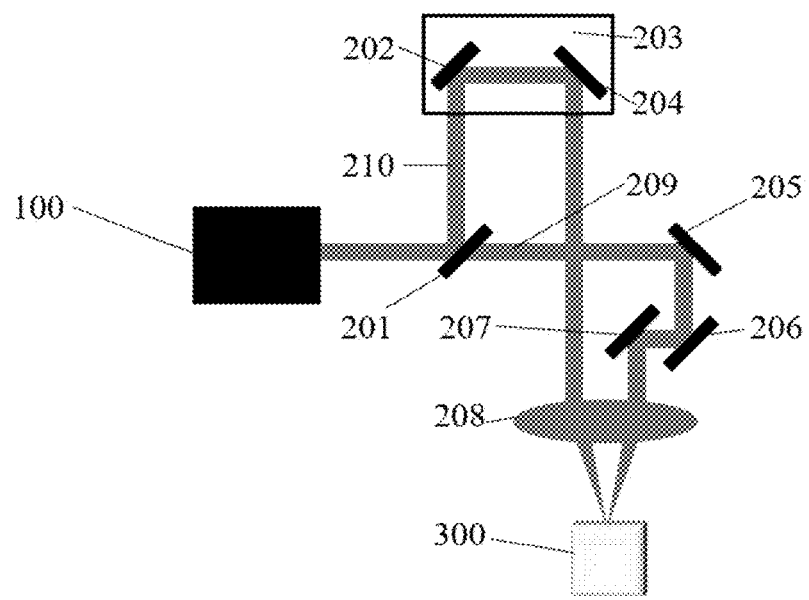
FIG. 1 is a schematic diagram of a device for manufacturing a large-area volume grating via grating direct writing with ultrafast laser pulse according to some embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Embodiments of the present disclosure provide a method for manufacturing a large-area volume grating via plasma grating direct writing. This method uses ultrafast laser pulses to form a plasma grating in the sample first, then moves the sample to directly etch a local prefabricated volume grating, and then change the position of the plasma grating to make a part of the optical filaments in the plasma grating overlap with the local prefabricated volume grating. In this way, a large-area volume grating can be directly written with the etching of the plasma grating seamlessly and neatly by taking advantage of the waveguide coupling characteristics of the local prefabricated volume grating. This method not only simplifies the manufacturing process of the volume grating and reduces the manufacture cost of the volume grating, but also makes different design schemes of the volume gratings with different areas and different grating constants feasible, so as to manufacture meter-level gratings with high optical quality.

In a first aspect, embodiments of the present disclosure provide a method for manufacturing a large-area volume grating via plasma grating direct writing, including:

(1) splitting a laser beam output by an ultrafast pulse laser into two or more laser beams with equal power proportion via a splitting module, converging the two or more laser beams into a sample at an included angle θ less than 60° via a spatio-temporal synchronization module and a converging module, such that a first plasma grating is formed in the sample by interference of the two or more laser beams, the sample being fixed on an electronically controlled three-dimensional mobile platform;

(2) moving the sample in a longitudinal direction of a plane vertical to the first plasma grating to etch out a first prefabricated volume grating with an equivalent cross section to that of the first plasma grating;

(3) moving the sample laterally and keeping a distance from a focal point of the two or more laser beams to a front surface of the sample unchanged to form a second plasma grating at another position of the sample, an effective cross section of the first prefabricated volume grating partially overlapping with a cross section of the second plasma grating, then moving the sample in a longitudinal direction of a plane vertical to the second plasma grating to etch out a second prefabricated volume grating with an equivalent cross section to that of the second plasma grating;

(4) repeating steps (2) and (3) n times to obtain a volume grating having a width W=n·w0, a length equal to a length L etched by each plasma grating in a cross section of the sample perpendicular to a propagation direction of the laser, and a depth equal to a length D of optical filaments of each plasma grating formed in the sample, wherein n represents a positive integer greater than 0, w0 represents an effective width of each plasma grating.

With the method according to embodiments of the present disclosure, a large-area volume grating may be obtained by one-dimensional splicing of the n prefabricated volume gratings, that is, during the manufacturing of the n prefabricated volume gratings, the distance from the focal point of the two or more laser beams to the front surface of the sample is kept unchanged, such that the n prefabricated volume gratings may be assembled together in a direction of the diameter w0 of the cross section of the plasma grating. It will be appreciated that n is a positive integer, and its specific value is not particular limited herein, which can be determined by those skilled in the art as required, so as to design a volume grating with any size they want.

In some embodiments of the present disclosure, the laser beam output by the ultrafast pulse laser is a femtosecond pulse laser beam, a picosecond pulse laser beam, or a femtosecond/picosecond pulse laser cluster.

In some embodiments of the present disclosure, the splitting module is selected from a splitting slice, a micro-mirror array and a diffraction beam splitting device, and is configured to split a laser pulse beam into two or more laser beams with equal power proportion.

In some embodiments of the present disclosure, the spatio-temporal synchronization module consists of a plurality of plane mirrors and an electronically controlled mobile platform and is configured to adjust spatio-temporal interval of the two or more laser beams.

In some embodiments of the present disclosure, the converging module is a rounded lens, which is configured to fabricating lattice gratings in cooperation with the movement of the electronically controlled mobile platform.

In some embodiments of the present disclosure, the converging module is a cylindrical lens, which is configured to focus beams in one dimension and is suitable to fabricate a plane volume grating.

In some embodiments of the present disclosure, the converging module is a tapered lens, which is configured to transform a Gaussian beam into a Bessel beam to form longer optical filaments in the sample, which is suitable for fabricating a plane grating or a Bragg volume grating. Use of the tapered lens can not only reduce the split of the plasma optical filaments, but also increase the electron density in the plasma optical filaments.

In some embodiments of the present disclosure, the converging module is a micro-lens array, each micro lens of which is able to converge laser beams to form a plasma lattice. By adjusting a focal length of the micro lens and an incident light power, the method according to embodiments of the present disclosure is applicable to manufacture a lattice grating, a three-dimensional volume grating, or a photonic crystal with periodically distributed high and low refractive indexes.

It will be appreciated that different kinds of converging modules may be selected or combined by those skilled in the art according to the design requirements of the volume grating.

In some embodiments of the present disclosure, the included angle θ refers to an angle between propagation directions of any two laser beams, and a period Λ of the plasma grating formed by the interference of the two or more laser beams in the sample meets a formula: $\Lambda=\lambda/2 \sin(\theta/2)$.

In some embodiments of the present disclosure, the interference of the two or more laser beams includes the interference of two laser beams, such that a one-dimensional plasma grating is formed.

In some embodiments of the present disclosure, the interference of the two or more laser beams includes the interference of three or four laser beams, such that a two-dimensional plasma grating is formed.

In some embodiments of the present disclosure, the interference of the two or more laser beams includes the interference of five laser beams, such that a three-dimensional plasma grating is formed.

In some embodiments of the present disclosure, each prefabricated volume grating is etched through once scan of the respective plasma grating in the sample, and the prefabricated volume grating obtain thereby has a width equal to the effective width w0 of the respective plasma grating, a length equal to a length L etched by the respective plasma grating in the cross section of the sample perpendicular to the propagation direction of the laser, and a depth equal to a length D of the optical filaments of the respective plasma grating formed in the sample.

In some embodiments of the present disclosure, the method further includes changing the distance from the focal point of the two or more laser beams to the front surface of the sample, and repeating the steps (2) and (3). In this way, prefabricated volume gratings may be spliced in the longitudinal direction. In combination with the splicing of the prefabricated volume gratings in the lateral direction, two-dimensional splicing of the prefabricated volume gratings may be realized.

In some embodiments of the present disclosure, the method further includes rotating the sample by 90°, and repeating the steps (2) to (3) to fabricate a two-dimensional grating. Therefore, the method according to embodiments of the present disclosure not only can be used to fabricate the one-dimensional plane grating or volume grating, but also can be used to fabricate the two-dimensional grating.

In some embodiments of the present disclosure, the sample is made of quartz glass, doped-glass or a transparent material.

In some embodiments of the present disclosure, the method further includes applying the two or more laser beams to a surface of the sample to form a surface plasma grating, which may be used to fabricate a surface grating. Therefore, the method according to embodiments of the present disclosure is also applicable to manufacture the surface grating.

In some embodiments of the present disclosure, the ultrafast pulse laser may be a fundamental monochromatic field or a two-color laser field including a fundamental wave and a second harmonic. When the two-color laser field is applied to the surface of the sample, the second harmonic is easier to cause ionization damage on the surface of the sample to generate local plasmas due to its higher photon energy, and plasma resonance ionization occurs under the coaction of the fundamental wave and the local plasma. Therefore, when the two-color laser field is used to process the sample, the ionization threshold is lower than that of the monochromatic field.

In some embodiments of the present disclosure, the method further includes applying an auxiliary gas near the focal point of the two or more laser beams when fabricating the surface grating. The auxiliary gas is a gas that is easier to ionize than air in a strong field. Under the action of the auxiliary gas, the density of the plasmas generated at a place where the laser beams act is increased greatly so as to enhance the processing efficiency, and small particles generated by ablation can be taken away so as to reduce the roughness of the processed surface.

In some embodiments of the present disclosure, the method further includes applying an electrostatic field near the focal point of the two or more laser beams when fabricating the surface grating. The electrostatic field will guide and accelerate the plasmas generated by the laser beams, so that more electrons will bombard the ablated surface of material with higher kinetic energy, thereby increasing the efficiency of laser processing.

In some embodiments of the present disclosure, the method further includes plating a metal oxide film or a silicon oxide film on the surface of the sample before fabricating the surface grating, and exposing the sample to plasmas to obtain an ion-doped grating. In this way, trenches of the surface grating will be deeper, and reaches submicron level.

In a second aspect, embodiments of the present disclosure provide a device for manufacturing a large-area volume grating via plasma grating direct writing. The device includes:

an ultrafast pulse laser, configured to emit an ultrafast laser beam;

a splitting module, configured to split the ultrafast laser beam into two or more laser beams;

a spatio-temporal synchronization module, configured to adjust spatio-temporal interval of the two or more laser beams;

a converging module, configured to converge the two or more laser beams into a sample at an included angle θ less than 60°, such that a first plasma grating is formed in the sample by interference of the two or more laser beams; and a three-dimensional mobile platform, configured to:

(1) move the sample in a longitudinal direction of a plane vertical to the first plasma grating to etch out a first prefabricated volume grating with an equivalent cross section to that of the first plasma grating;

(2) move the sample laterally and keep a distance from a focal point of the two or more laser beams to a front surface of the sample unchanged to form a second plasma grating at another position of the sample, an effective cross section of the first prefabricated volume grating partially overlapping with a cross section of the second plasma grating;

(3) move the sample in a longitudinal direction of a plane vertical to the second plasma grating to etch out a second prefabricated volume grating with an equivalent cross section to that of the second plasma grating, such that the sample is moved periodically to periodically manufacture prefabricated volumes to finally obtain a volume grating having a width W=n·w0, a length equal to a length L etched by each plasma grating in a cross section of the sample perpendicular to a propagation direction, and a depth equal to a length D of optical filaments of each plasma grating formed in the sample, wherein n represents a positive integer greater than 0, w0 represents a width of each plasma grating.

In a third aspect, embodiments of the present disclosure provide a non-transitory computer-readable storage medium. The non-transitory computer-readable storage medium has stored therein instructions that, when executed by a processor of a mobile terminal, causes the method as described hereinbefore to be performed.

It should be illustrated that, the contents described above in embodiments with respect to the method for manufacturing a large-area volume grating are also applicable to embodiments with respect to the device for manufacturing a large-area volume grating and the non-transitory computer-readable storage medium, which will not be elaborated herein.

Compared with the related art, the method according to embodiments of the present disclosure has the following advantages.

The method of the present disclosure uses an ultrafast laser pulses to directly write the volume grating in the glass sample, even in a sample made of any light-transmitting material, which breaks through the limitation of the single material (i.e., photosensitive glass) in the manufacture of traditional volume gratings.

The plasma grating is composed of a large number of plasma optical filaments distributed at equal intervals, and each plasma optical filament can etch the glass sample to generate a single-period refractive index modulation structure. Therefore, the manufacturing speed of the volume grating is improved greatly increases by using the plasma grating.

In the manufacture of the large-area volume gratings, the principles of waveguide coupling and dual-beam interference phase modulation are used. Due to the difference of refractive indexes, the prefabricated volume grating etched by the optical filaments constitutes a series of waveguide arrays for the incident beams. Therefore, in the splicing process, the plasma grating will be spliced with the prefabricated volume grating automatically and seamlessly through waveguide coupling, which has extremely high accuracy. This splicing method not only avoids errors such as tilt and misalignment present in the traditional grating splicing process, but also can manufacture volume gratings with different grating periods and different sizes.

The formation of the plasma grating does not depend on the polarization state of the laser, so the method of the present disclosure does not have a high requirement for the polarization state of the light source, and the polarization plane of the laser pulse does not need to be maintained all the time during the processing, which simplifies the equipment and lowers the accuracy requirements on the equipment.

When a tapered lens is used to converge the laser beams to form the plasma optical filaments, the incident Gaussian beams can be transformed into the Bessel beams, which not only avoids the filament splitting caused by the distribution of energy hotspots in the light spot, but also increases the length of the filaments with the increase of laser energy. In addition, since the optical filaments are not easy to split, the plasma density in the optical filament channel can increase by more than 10 times, which is beneficial to the manufacture of the volume grating.

For better understanding, the present disclosure will be described in detail below with reference to the companying drawings and the following examples.

EXAMPLES

A glass sample is fixed on an electronically controlled three-dimensional mobile platform. A laser beam output by a femtosecond pulse laser is split into two or more laser beams via a splitting module, and then the two or more laser beams are converged into the glass sample at an included angle θ less than 60° via a spatio-temporal synchronization module and a converging module, such that a first plasma grating is formed in the sample by interference of the two or more laser beams. Afterwards, the glass sample is moved in a longitudinal direction of a plane vertical to the first plasma grating to etch out a first prefabricated volume grating with an equivalent cross section to that of the first plasma grating. Next, the glass sample is moved laterally to form a second plasma grating at another position of the glass sample, and an effective cross section of the first prefabricated volume grating partially overlaps with a cross section of the second plasma grating; then the sample is moved in a longitudinal direction of a plane vertical to the second plasma grating to etch out a second prefabricated volume grating with an equivalent cross section to that of the second plasma grating. In this manner, by repeated etching in the glass sample with plasma gratings, volume gratings of arbitrary area can be manufactured.

Figure 3:
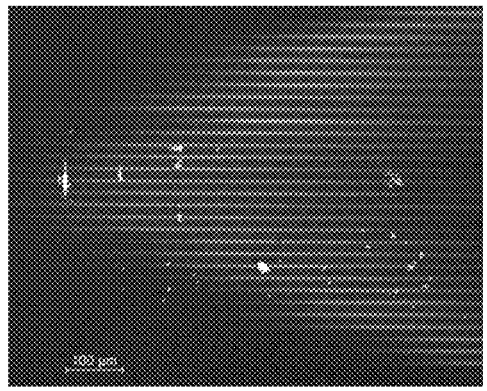
FIG. 3 is a schematic diagram of a plasma grating formed in a sample by ultrafast laser pulse, according to some embodiments of the present disclosure.

For example, the formation of the plasma gratings is as follows. As shown in FIG. 1, femtosecond pulse laser output by a femtosecond pulse laser 100 is split via a beam splitter 201 into a transmitted laser pulse 209 and a reflected laser pulse 210, which have the same power. The transmitted laser pulse 209 passes through the plane mirrors 205, 206 and 207 in sequence to change its propagation direction and then is converged into a glass sample 300 by a lens 208. The reflected laser pulse 210 enters a spatio-temporal synchronization module which consists of plane mirrors 202, 204 and an electrically controlled movable platform 203 and keeps spatio-temporal synchronization with the transmitted laser pulse 209, and then enters the glass sample 300 after converged by the lens 208. When converged into the glass sample, interference will occur between the reflected laser pulse 210 and the transmitted laser pulse 209 in the glass sample to form a plasma grating. The cross section of the plasma grating is as shown in FIG. 3. The plasma grating has a period Λ meeting a formula: $\Lambda = \lambda/2\ \sin(\theta/2)$, where θ represents an included angle between the transmitted laser pulse 209 and the reflected laser pulse 210.

Figure 2:
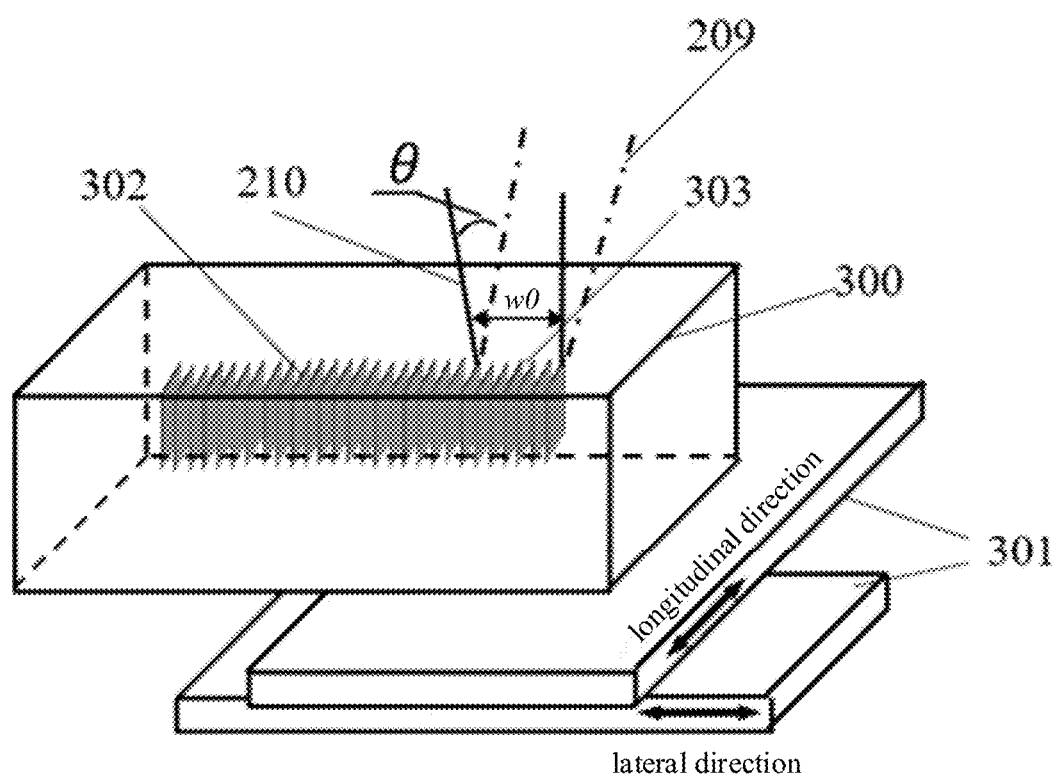
FIG. 2 is a schematic diagram illustrating a splicing principle of a large-area volume grating according to some embodiments of the present disclosure.
Figure 4:
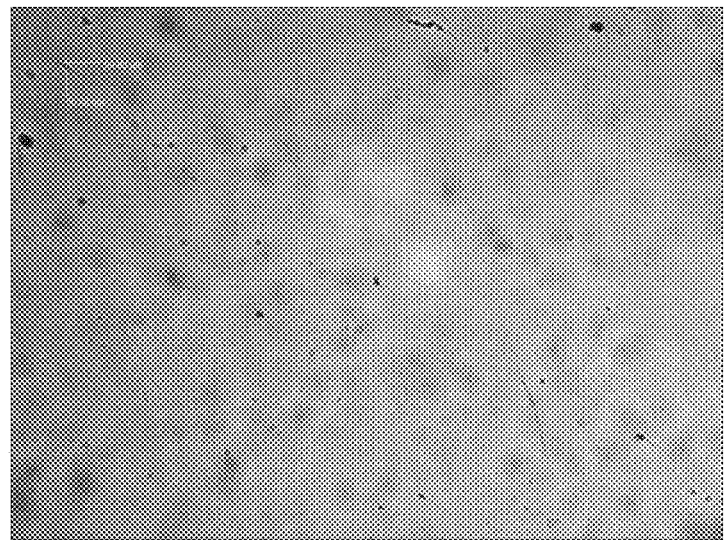
FIG. 4 is a schematic planar graph of a volume grating manufactured by a plasma grating splicing technology according to some embodiments of the present disclosure.

The etching of a large-area volume grating is shown in FIG. 2. The glass sample 300 is fixed on an electronically controlled moveable platform 301. After a first plasma grating 303 is formed, the electronically controlled moveable platform 301 controls the glass sample 300 to move in a longitudinal direction of a plane vertical to the first plasma grating 303 to fabricate a first prefabricated volume grating 302, which has an equivalent cross section to that of the first plasma grating 303. Then, the glass sample 300 is moved laterally to form a second plasma grating 303 at another position of the glass sample, such that the second plasma grating 303 partially overlaps with the first prefabricated volume grating 302, and thus a part of the optical filaments in the second plasma grating 303 will be coupled into the first prefabricated volume grating 302 to realize splicing. Then, the sample is moved again in a longitudinal direction of a plane vertical to the second plasma grating to fabricate a second prefabricated volume grating, and the second prefabricated volume grating 302 also partially overlaps with the first prefabricated volume grating 302, thereby achieving the seamless splicing between the first prefabricated volume grating 302 and the second prefabricated volume grating 302. In this way, by repeatedly changing the position of the plasma grating 302 and fabricating the respective prefabricated volume grating, a large-area volume grating in any size and having different grating periods can be etched in the glass sample 300. FIG. 4 is a schematic planar graph showing a local structure of a large-area volume grating spliced by several prefabricated volume gratings directly written by the plasma grating. As shown in FIG. 4, the structure at the splicing position is regular, and the grating period at any position is the same as the period $\Lambda$ of the plasma grating.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for manufacturing a large-area volume grating via plasma grating direct writing, comprising:
   (1) splitting a laser beam output by an ultrafast pulse laser into two or more laser beams with equal power proportion via a splitting module, converging the two or more laser beams into a sample at an included angle θ less than 60° via a spatio-temporal synchronization module and a converging module, such that a first plasma grating is formed in the sample by interference of the two or more laser beams, the sample being fixed on an electronically controlled three-dimensional mobile platform;
   (2) moving the sample in a longitudinal direction of a plane vertical to the first plasma grating to etch out a first prefabricated volume grating with an equivalent cross section to that of the first plasma grating;
   (3) moving the sample laterally and keeping a distance from a focal point of the two or more laser beams to a front surface of the sample unchanged to form a second plasma grating at another position of the sample, an effective cross section of the first prefabricated volume grating partially overlapping with a cross section of the second plasma grating, then moving the sample in a longitudinal direction of a plane vertical to the second plasma grating to etch out a second prefabricated volume grating with an equivalent cross section to that of the second plasma grating; and
   (4) repeating steps (2) and (3) n times to obtain a volume grating having a width W=n·w0, a length equal to a length L etched by each plasma grating in a cross section of the sample perpendicular to a propagation direction of the laser, and a depth equal to a length D of optical filaments of each plasma grating formed in the sample, wherein n represents a positive integer greater than 0, w0 represents an effective width of each plasma grating.

2. The method according to claim 1, wherein the laser beam output by the ultrafast pulse laser is a femtosecond pulse laser beam, a picosecond pulse laser beam, or a femtosecond/picosecond pulse laser cluster.

3. The method according to claim 1, wherein the splitting module is selected from a splitting slice, a micro-mirror array and a diffraction beam splitting device.

4. The method according to claim 1, wherein the spatio-temporal synchronization module consists of a plurality of plane mirrors and an electronically controlled mobile platform, and is configured to adjust spatio-temporal interval of the two or more laser beams.

5. The method according to claim 1, wherein the converging module is selected from a rounded lens, a cylindrical lens, a tapered lens, a micro-lens array or any combination thereof.

6. The method according to claim 1, wherein the included angle θ refers to an angle between propagation directions of any two laser beams, a period/of each plasma grating formed by the interference of the two or more laser beams in the sample meets a formula: $\Lambda=\lambda/2 \sin(\theta/2)$.

7. The method according to claim 1, wherein the interference of the two or more laser beams comprises interference of two laser beams, such that a one-dimensional plasma grating is formed, or
    the interference of the two or more laser beams comprises interference of three or four laser beams, such that a two-dimensional plasma grating is formed; or the interference of the two or more laser beams comprises interference of five laser beams, such that a three-dimensional plasma grating is formed.

8. The method according to claim 1, wherein each prefabricated volume grating is etched through once scan of the respective plasma grating in the sample, and each prefabricated volume grating has a width equal to the effective width w0 of the respective plasma grating, a length equal to a length L etched by the respective plasma grating in the cross section of the sample perpendicular to the propagation direction, and a depth equal to a length D of the optical filaments of the respective plasma grating formed in the sample.

9. The method according to claim 1, further comprising:
changing the distance from the focal point of the two or more laser beams to the front surface of the sample, and then repeating the steps (2) to (3).

10. The method according to claim 1, further comprising:
rotating the sample by 90°, and repeating the steps (2) to (3) to fabricate a two-dimensional grating.

11. The method according to claim 1, wherein the sample is made of quartz glass, doped-glass or a transparent material.

12. The method according to claim 1, further comprising:
applying the two or more laser beams to a surface of the sample to form a surface plasma grating, so as to fabricate a surface grating.

13. The method according to claim 12, wherein the ultrafast pulse laser is a fundamental monochromatic field or a two-color laser field comprising a fundamental wave and a second harmonic.

14. The method according to claim 12, further comprising:
applying an auxiliary gas near the focal point of the two or more laser beams when fabricating the surface grating,
wherein the auxiliary gas is a gas that is easier to ionize than air in a strong field.

15. The method according to claim 12, further comprising:
applying an electrostatic field near the focal point of the two or more laser beams to guide and accelerate plasmas generated by the ultrafast pulse laser when fabricating the surface grating.

16. The method according to claim 12, further comprising:
plating a metal oxide film or a silicon oxide film on the surface of the sample before fabricating the surface grating; and
exposing the sample to plasmas to obtain an ion-doped grating.

17. A non-transitory computer-readable storage medium having stored therein instructions that, when executed by a processor, causes the method according to claim 1 to be performed.

18. A device for manufacturing a large-area volume grating via plasma grating direct writing, comprising:
an ultrafast pulse laser, configured to emit an ultrafast laser beam;
a splitting module, configured to split the ultrafast laser beam into two or more laser beams;
a spatio-temporal synchronization module, configured to adjust spatio-temporal interval of the two or more laser beams;
a converging module, configured to converge the two or more laser beams into a sample at an included angle $\theta$ less than 60°, such that a first plasma grating is formed in the sample by interference of the two or more laser beams; and
a three-dimensional mobile platform, configured to:
(1) move the sample in a longitudinal direction of a plane vertical to the first plasma grating to etch out a first prefabricated volume grating with an equivalent cross section to that of the first plasma grating;
(2) move the sample laterally and keep a distance from a focal point of the two or more laser beams to a front surface of the sample unchanged to form a second plasma grating at another position of the sample, an effective cross section of the first prefabricated volume grating partially overlapping with a cross section of the second plasma grating; and
(3) move the sample in a longitudinal direction of a plane vertical to the second plasma grating to etch out a second prefabricated volume grating with an equivalent cross section to that of the second plasma grating, such that the sample is moved periodically to periodically manufacture prefabricated volumes to finally obtain a volume grating having a width $W=n \cdot w0$, a length equal to a length L etched by each plasma grating in a cross section of the sample perpendicular to a propagation direction, and a depth equal to a length D of optical filaments of each plasma grating formed in the sample, wherein n represents a positive integer greater than 0, w0 represents a width of each plasma grating;
wherein the sample is made of quartz glass, doped-glass or a transparent material.

19. The device according to claim 18, wherein the three-dimensional mobile platform is further configured to change the distance from the focal point of the two or more laser beams to the front surface of the sample.

20. The device according to claim 18, wherein the ultrafast pulse laser is a femtosecond pulse laser, a picosecond pulse laser, or a combination thereof; and
the converging module is selected from a rounded lens, a cylindrical lens, a tapered lens, a micro-lens array or any combination thereof.

* * * * *